United States Patent [19]

Sandrock

[11] 4,096,639

[45] Jun. 27, 1978

[54] NICKEL-MISCHMETAL-CALCIUM ALLOYS FOR HYDROGEN STORAGE

[75] Inventor: Gary Dale Sandrock, Ringwood, N.J.

[73] Assignee: The International Nickel Company, Inc., New York, N.Y.

[21] Appl. No.: 739,483

[22] Filed: Nov. 8, 1976

[51] Int. Cl.² .............................................. F26B 5/04
[52] U.S. Cl. .......................................... 34/15; 55/16; 62/48; 75/170; 423/654
[58] Field of Search ................... 34/15; 62/48; 55/16; 75/170; 423/654, 644; 252/181.7

[56] References Cited

U.S. PATENT DOCUMENTS

| | | | |
|---|---|---|---|
| 2,771,359 | 11/1956 | Morana | 75/170 |
| 3,704,600 | 12/1972 | Prast et al. | 62/457 |
| 3,732,690 | 5/1973 | Meijer | 60/39.46 |
| 3,793,435 | 2/1974 | Reilly et al. | 423/248 |
| 3,825,418 | 7/1974 | Reilly et al. | 75/159 |
| 3,883,346 | 5/1975 | Martin | 75/0.5 BA |
| 3,967,465 | 7/1976 | Asselman et al. | 62/48 |

FOREIGN PATENT DOCUMENTS

| | | | |
|---|---|---|---|
| 7,516,160 | 12/1976 | France | 34/15 |
| 1,291,976 | 10/1972 | United Kingdom. | |
| 1,320,093 | 6/1973 | United Kingdom. | |

OTHER PUBLICATIONS

H. H. Van Mal, K. H. J. Buschow, and A. R. Miedema, "Hydrogen Absorption in LaNi$_5$ and Related Compounds: Experimental Observations and Their Explanation," Journal of the Less Common Metals, Vol. 35, 1974, pp. 65–76.

*Primary Examiner*—John J. Camby
*Attorney, Agent, or Firm*—Miriam W. Leff; Ewan C. MacQueen

[57] ABSTRACT

A nickel-mischmetal-calcium compound is used to store gaseous hydrogen at pressures up to about 15 atmospheres at ambient temperatures. The $Ni_5M_{1-y}Ca_y$ compounds have values of y ranging from about 0.2 to about 0.9. Alloys conforming to this formula contain from about 4% to about 27% mischmetal, from about 2% to about 11% calcium, up to about 15% copper, and the balance essentially nickel.

2 Claims, No Drawings

NICKEL-MISCHMETAL-CALCIUM ALLOYS FOR HYDROGEN STORAGE

The present invention is directed to a method for storing hydrogen by absorption in nickel-mischmetal-calcium alloys.

The use of hydrogen gas as a fuel has received considerable attention during recent years because hydrogen can be generated by a variety of methods that do not rely on fossil fuels, (e.g. solar energy, nuclear energy, and water power). One of the principal problems confronting wide acceptance of hydrogen as a fuel is related to storage. At present, hydrogen is commonly stored under relatively high pressure, e.g., 136 atmospheres, in steel storage cylinders. This type of storage is adequate for many applications; however, due to weight and bulk requirements, such high-pressure cylinders cannot be readily adapted to the requirements of operational units such as vehicles. Furthermore, in many instances, the required high pressures are considered unsafe.

In order to circumvent the problems attending conventionally used storage methods, considerable attention has been directed recently to the storage of hydrogen as a hydride. Compounds of the type $AB_5$ and commonly referred to as a $CaCu_5$ type of structure have received considerable attention. The compounds have a hexagonal crystal structure and are capable of absorbing hydrogen to a volume density of almost twice that found in liquid hydrogen, roughly $6 \times 10^{22}$ atoms/cm$^3$.

In my co-pending application, it is shown that $CaNi_5$ offers the capability for storing hydrogen at subatmospheric pressures. This discovery is in direct contrast to the publication by H.H. Van Mal, K.H.J. Buschow, and A.R. Miedema reported in the Journal of the Less-Common Metals, Vol. 35, (1974), which showed an absorption/desorption plateau of about 15 atmospheres for $CaNi_5$.

It is known from U.S. Pat. No. 3,825,418 that $Ni_5M$ compounds (where M represents mischmetal) are useful for hydrogen storage. However, the minimum hydrogen pressure required for sorption is reported therein to be about 41 atmospheres (600 psi) at 25° C.

The preparation of a nickel-rare earth (lanthanum)-calcium compound is shown in U.S. Pat. No. 3,883,346. However, this patent shows that the residual quantity of calcium is undesirable, limiting this element to 0.4 weight percent.

The aforedescribed publication and patents are concerned with compounds or alloys that require relatively high pressures for absorption and storage of hydrogen. As a consequence, the requirement remains for relatively heavy-walled, low-alloy steel containers, albeit not quite as strong as conventional hydrogen storage cylinders.

It has now been discovered that hydrogen can be advantageously stored in a nickel-mischmetal-calcium compound at pressures between about 1 atmosphere and 15 atmospheres.

Generally speaking, the present invention is directed to a method for storing hydrogen at pressures ranging from about 1 atmosphere to about 15 atmospheres comprising contacting a hydrogen containing gas with a granulated $Ni_5M_{1-y}Ca_y$ compound, where M represents mischmetal and $y$ is from about 0.2 to about 0.9.

Compounds ranging from $Ni_5M_{0.8}Ca_{0.2}$ to $Ni_5M_{0.1}Ca_{0.9}$ provide variable hydrogen gas storage at 25° C at pressures from about 15 atmospheres to about 1 atmospheres respectively and dependent upon the particular composition of the compound as defined by the equation $$P = 28.5 \exp(-2.9y)$$

at a H/M ratio of 0.5 (atomic ratio of the number of hydrogen atoms to the number of metal atoms), at 25° C, with P being the desorption pressure in atmospheres. The ratio of nickel to mischmetal plus calcium on an atomic basis should be from about 4.5 to about 5.5 and preferably from about 4.8 to about 5.2.

The foregoing shows that more favorable hydrogen storage conditions, from the standpoint of high pressure safety, can be provided than available through the use of a $Ni_5M$ compound which is relatively unstable and for which a hydrogen dissociation pressure at 25° C of about 29 atmospheres was determined experimentally. Conversely, low pressure storage is available in compounds such as $Ni_5M_{0.1}Ca_{0.9}$ of the same magnitude as available in a known $Ni_5La$ compound, i.e., about 1.7 atmosphere; however, the cost per gram of hydrogen stored is significantly lower in the nickel-mischmetal-calcium compound. To illustrate, on the basis of raw material cost alone, a $Ni_5La$ compound costs, at current prices, about $1.49 per gram of hydrogen stored, whereas a $Ni_5M_{0.1}Ca_{0.9}$ compound costs $0.44 per gram of hydrogen stored.

Although the compounds of the present invention are significantly lower in cost than $Ni_5La$ compounds, they are priced substantially higher than iron-titanium compounds which cost, on a raw material basis, about $0.20 per gram of hydrogen stored. However, the compounds of the present invention are substantially insusceptible to poisoning by gases such as $O_2$, CO, $CO_2$, $CH_4$, etc. Contamination by such gases restricts the capacity of iron-titanium compounds for hydrogen storage and limits their use to gas streams containing high purity hydrogen.

The compounds of this invention are generally prepared on a weight basis since the individual ingredients are combined by melting; and hence, it is convenient to describe the compound in the terminology commonly used for alloy preparation.

The compounds or alloys of this invention contain, in weight percent, from about 4% to about 27% mischmetal, from about 2% to about 11% calcium, with the balance essentially nickel. In order to minimize the cost of the raw materials used in the preparation of the alloy, it has been found expedient to substitute some copper in place of the nickel. Up to about 15 weight percent copper can be substituted for nickel for this purpose. However, substitution of copper substantially lowers the hydrogen storage capacity of the alloy so that on the basis of material cost per gram of hydrogen stored, this substitution is considered to be more expensive than the nickel-mischmetal-calcium alloys as will be shown hereinafter. However, the substitution of copper in part for nickel can serve to improve the resistance of the alloy to contamination by gases such as CO, $CO_2$, $N_2$, etc.

Preferred alloys contain, in weight percent, from about 6% to about 15% mischmetal, from about 6% to about 10% calcium, and the balance essentially nickel. A most preferred alloy contains about 12% mischmetal, about 8% calcium, and the balance essentially nickel. Such a preferred alloy offers the lowest raw material cost per gram of hydrogen storage and a favorable dissociation pressure ranging from about 6 atmospheres down to about 1.3 atmospheres absolute.

As will be understood by those skilled in the art, the use of the expression "balance essentially" does not exclude the presence of other elements commonly present as incidental elements, e.g., the deoxidizing and cleansing aid elements, and impurities normally associated therewith in small amounts which do not adversely affect the novel characteristics of the alloys.

The compounds or alloys can be prepared by air melting or by vacuum melting and casting into ingot molds as hereinafter described.

Following cooling to room temperature, the ingots are removed from the molds and crushed to granular form. A U.S. Standard Mesh Size of about −4 has been found appropriate for hydriding applications.

The crushed and sieved alloy is introduced to a suitable, valved pressure vessel for hydriding. Initial hydriding or activation can be accomplished by evacuating the vessel and then introducing gaseous hydrogen at ambient temperatures and pressures above about 5 atmospheres, (with the minimum pressure dependent on composition). The alloy begins to absorb hydrogen almost immediately and is generally fully hydrided within about 1 hour. Once the nickel-calcium-mischmetal alloy is charged with hydrogen, the vessel is valved off and ready for use as a source of hydrogen. Subsequent recharging with hydrogen is accomplished in time periods significantly less than 1 hour, e.g., 10 minutes.

The aforedescribed vessels can be used for any number of applications, including the provision of a hydrogen atmosphere to a furnace, as a fuel source for an internal combustion engine, etc.

For the purpose of giving those skilled in the art a better understanding of the invention, the following examples are given:

EXAMPLES

Eight kilogram heats having the compositions shown in Table I were prepared by induction melting. The alloys identified as 1 and 2 were melted under vacuum in an alumina crucible. The alloys identified as 3 through 6 and the alloys outside of the invention identified as A and B were all prepared by air melting in a clay-graphite crucible, (e.g., a number 30 crucible sold under the Trademark DIXAGRAF and available from Joseph Dixon Crucible Company).

In the air-induction melting practice, nickel is melted, mischmetal added, and the calcium plunged below the surface of the melt. The melt is induction stirred to provide thorough mixing of the ingredients and poured into ingot molds.

A vacuum melting practice consists of melting nickel under a vacuum of about $10^{-2}$ Torr, adding mischmetal, backfilling the vacuum chamber with argon to a pressure of about 380 Torr, adding calcium, inductively stirring for about 1 minute, and pouring into ingot molds. The melt temperature should be maintained below about 1500° C to substantially avoid reduction of the alumina crucible.

Mischmetal is a mixture of rare-earth elements in metallic form; the rare-earth elements have atomic numbers between 57 and 71. The commercially produced mischmetal used to prepare the alloys of this invention was obtained from the Molybdenum Corporation of America and contained about 48 to 50% cerium, 32 to 34% lanthanum, 13 to 14% neodymium, 4 to 5% praseodymium, and about 1.5% other rare-earth metals. As those skilled in the art will understand other commercially available grades of mischmetal can be substituted for preparation of the alloys of this invention, (e.g., a cerium-free mischmetal).

Eight grams of −10 mesh, +14 mesh granules of the nickel-mischmetal-calcium alloys were placed in a 15mm diameter by 35mm high reactor vessel. A vacuum pump was used to remove air from this chamber to achieve a vacuum of about $10^{-2}$ Torr. The vacuum source was valved off and ultra high purity hydrogen introduced to the apparatus. For experimental purposes, a hydrogen pressure of 68 atmospheres was used to pressurize the apparatus. It was observed that the specimens began to activate immediately and absorb large quantities of hydrogen. The specimens were essentially saturated with hydrogen within a time period of generally about 1 hour.

Hydrogen desorption pressures were measured at 25° C as a function of H/M ratio (atomic ratio of the number of hydrogen atoms to the number of metal atoms). For each alloy, a sloping dissociation pressure plateau was found to exist for H/M ratios from about 0.2 to about 0.7. Table II shows the results of the dissociation pressure tests for the alloys identified as 1 through 6, A and B. The dissociation plateau for Alloy A, a nickel-mischmetal alloy, ranged from 26.0 to 31.5 atmospheres as compared to dissociation pressures of 13.0 to 15.4 for the nickel-mischmetal alloy, No. 1, containing about 2 weight percent calcium. At the other end of the spectrum, Alloy B, a $Ni_5Ca$ compound, had a sub-atmospheric dissociation pressure of 0.41–0.56 atmospheres, whereas the dissociation pressure of a nickel-calcium alloy containing about 5%, by weight, mischmetal was 0.8–1.8 atmosphere. Thus, Alloys 1 through 5 show that levels of dissociation pressure intermediate to that available in either the excessively high values available in nickel-mischmetal or the excessively low values available in nickel-calcium.

Also shown in Table II is an alloy, identified as No. 6, containing one part of copper substituted for one of the normal 5 parts of nickel. Although copper lowers the dissociation pressure somewhat, it decreases the hydrogen storage capacity. Thus, on the basis of raw material cost per gram of hydrogen stored, the copper-containing alloy is somewhat more expensive than copper-free alloys as shown in Table III.

TABLE I

IDENTIFICATION AND COMPOSITION OF HYRIDABLE COMPOUNDS

| Alloy Identity | Approximate Value of y in $Ni_5M_{1-y}Ca_y$ | Actual Formula of Compound | Analysis in weight percent, balance Ni | | | | | | |
|---|---|---|---|---|---|---|---|---|---|
| | | | Ni | Rare Earth Metals | Ca | O | N | C | Al |
| 1 | 0.2 | $Ni_5M_{0.80}Ca_{0.19}$ | 71.5 | 27.3 | 1.8 | 0.0011 | 0.0050 | (2) | 0.032 |
| 2 | 0.5 | $Ni_5M_{0.49}Ca_{0.45}$ | 77.5 | 18.4 | 4.85 | 0.0005 | 0.0075 | (2) | 0.064 |
| 3 | 0.7 | $Ni_5M_{0.29}Ca_{0.68}$ | 81.3 | 11.4 | 7.53 | 0.030 | 0.069 | 0.023 | (2) |
| 4 | 0.8 | $Ni_5M_{0.20}Ca_{0.78}$ | 83.2 | 7.86 | 8.86 | 0.059 | 0.055 | 0.022 | (2) |
| 5 | 0.9 | $Ni_5M_{0.10}Ca_{0.89}$ | 85.5 | 4.29 | 10.4 | 0.12 | 0.074 | 0.024 | (2) |

TABLE I-continued
IDENTIFICATION AND COMPOSITION OF HYRIDABLE COMPOUNDS

| Alloy Identity | Approximate Value of y in $Ni_5M_{1-y}Ca_y$ | Actual Formula of Compound | Analysis in weight percent, balance Ni | | | | | |
| --- | --- | --- | --- | --- | --- | --- | --- | --- |
| | | | Ni | Rare Earth Metals | Ca | O | N | C | Al |
| 6 | 0.7 | $Ni_4Cu_1M_{0.30}Ca_{0.67}$ | 64.3 | (1)11.6 | 7.36 | 0.047 | 0.056 | 0.017 | (2) |
| A | 0 | $Ni_5M_{1.00}$ | 68.0 | 32.3 | (2) | 0.010 | 0.006 | (2) | 0.029 |
| B | 1 | $Ni_5Ca_{0.98}$ | 88.5 | (2) | 11.8 | 0.038 | 0.085 | 0.018 | (2) |

(1)Also contains 17.3% Cu.
(2)not analyzed.

TABLE II

Dissociation pressures for H/M rations from 0.2 to 0.7 for alloys based on $Ni_5M_{1-y}Ca_y$, where y ranges from 0.2 to 0.9

| Alloy Identity | Value of y in $Ni_5M_{1-y}Ca_y$ | Dissociation pressure, atmospheres |
| --- | --- | --- |
| 1 | 0.2 | 13.0 – 15.4 |
| 2 | 0.5 | 3.5 – 12.3 |
| 3 | 0.7 | 1.4 – 6.2 |
| 4 | 0.8 | 1.5 – 4.7 |
| 5 | 0.9 | 0.8 – 1.8 |
| 6 | 0.7 | 1.0 – 15.5 |
| A | 0 | 26.0 – 31.5 |
| B | 1 | 0.41 – 0.56 |

TABLE III

| Raw Material Cost per Gram of Hydrogen Stored | | |
| --- | --- | --- |
| Alloy Identity | Approximate Formula of Compound | Dollars/Gram of Hydrogen |
| 1 | $Ni_5M_{0.8}Ca_{0.2}$ | 0.37 |
| 2 | $Ni_5M_{0.5}Ca_{0.5}$ | 0.38 |
| 3 | $Ni_5M_{0.3}Ca_{0.7}$ | 0.35 |
| 4 | $Ni_5M_{0.2}Ca_{0.8}$ | 0.35 |
| 5 | $Ni_5M_{0.1}Ca_{0.9}$ | 0.44 |
| 6 | $Ni_4Cu_1M_{0.3}Ca_{0.67}$ | 0.48 |
| A | $Ni_5M$ | 0.43 |
| C | $Ni_5La$ | 1.49 |

Although it is realized that the cost of preparing any one of the alloys of the present invention is dependent on other factors such as melting cost, crushing cost, activation cost, and resistance to gas impurities, Table III shows that the nickel-mischmetal-calcium alloys are price competitive with nickel-mischmetal, and particularly nickel-lanthanum. Consequently, in addition to the advantages of hydrogen absorption at lower pressures, substantially improved insusceptibility to contamination and ease of preparation, the alloys of this invention appear to offer a cost advantage over presently existing nickel alloys useful for hydrogen storage.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method for storing hydrogen at pressures ranging from about 1 atmosphere to about 15 atmospheres comprising, contacting a hydrogen containing gas with a granulated $Ni_5M_{1-y}Ca_y$ compound at an ambient temperature, where M represents mischmetal and $y$ is from about 0.2 to about 0.9.

2. A method for storing hydrogen as defined in claim 1 wherein a hydrogen desorption pressure (P) is a function of said compound formula according to a relationship $$P = 28.5 \exp(-2.9y).$$

* * * * *